UNITED STATES PATENT OFFICE.

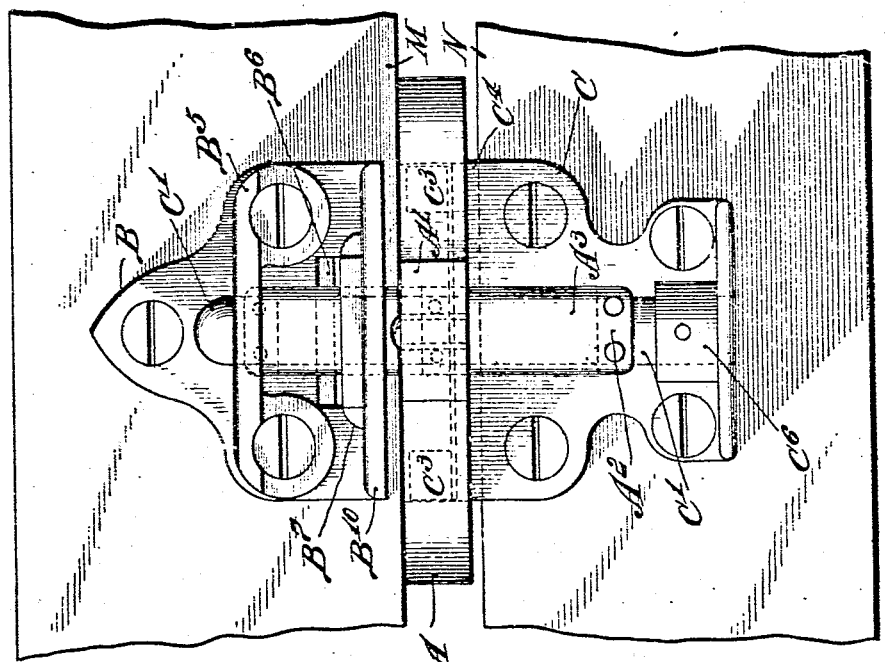
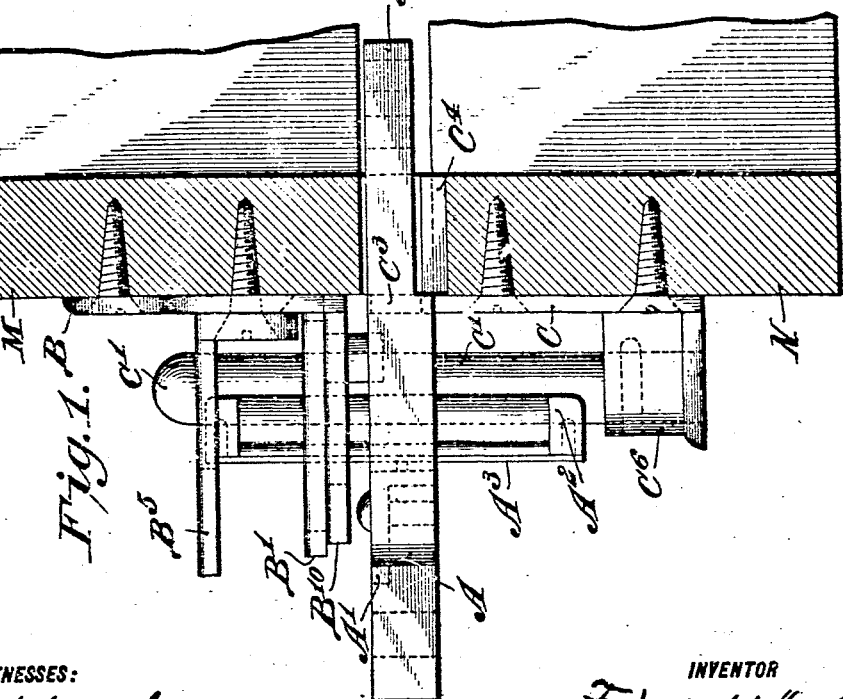

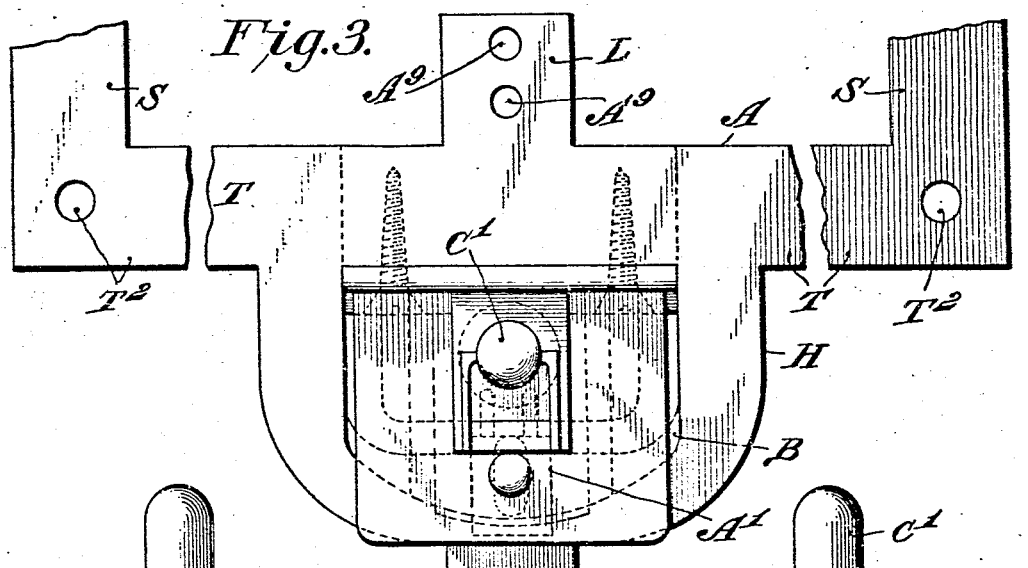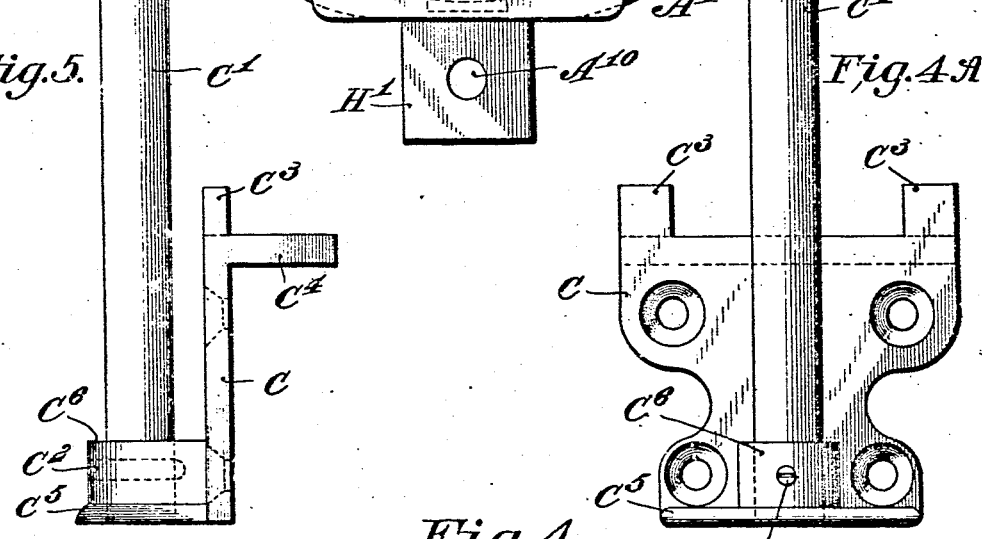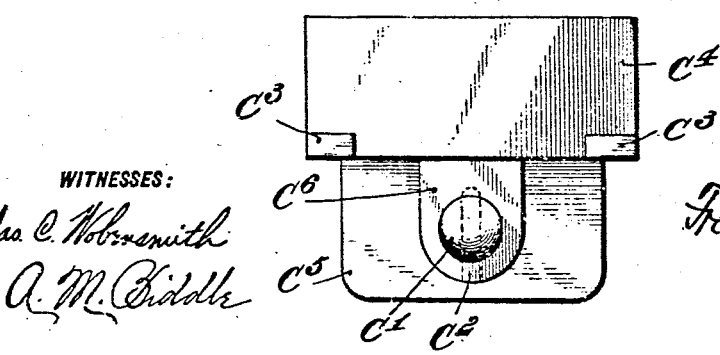

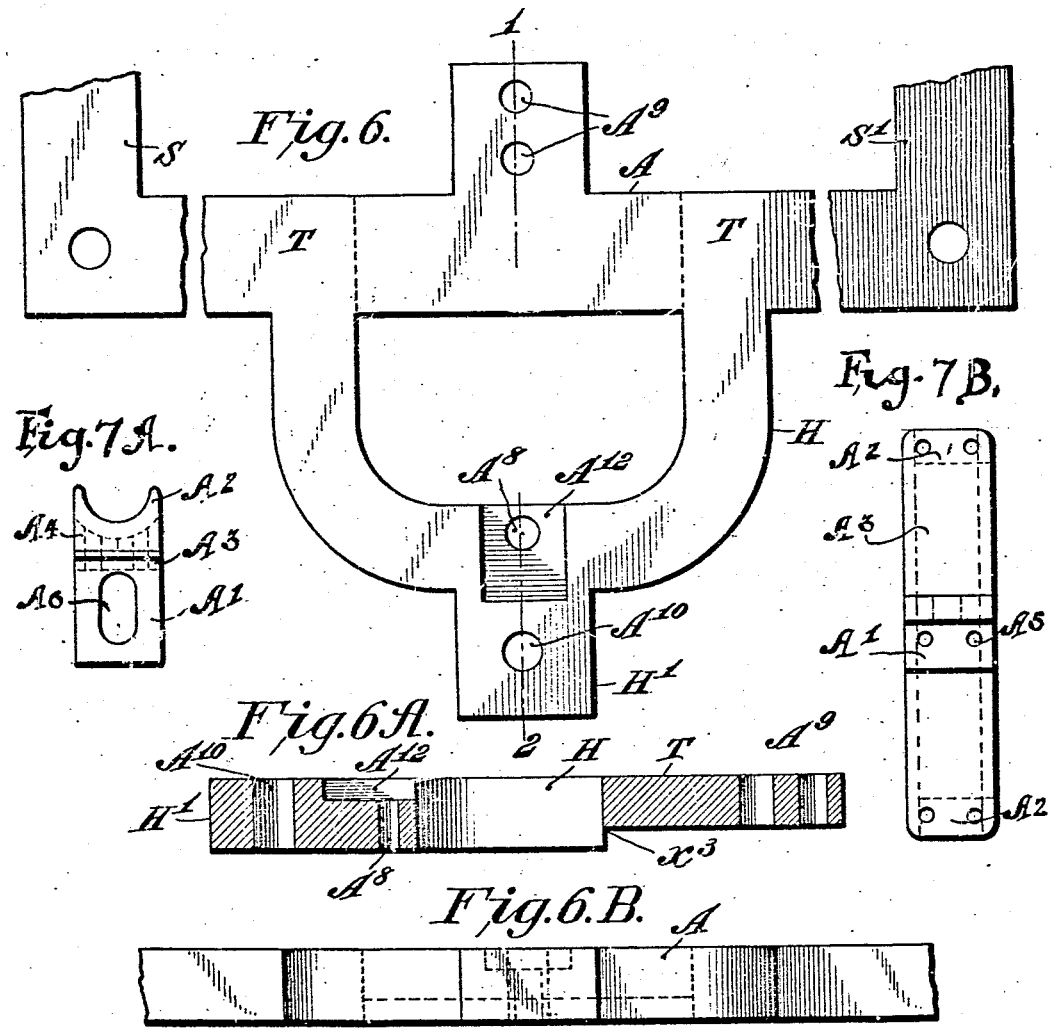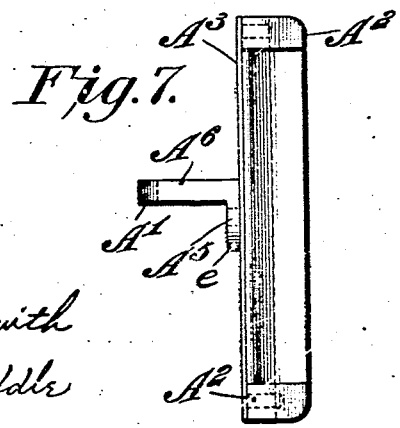

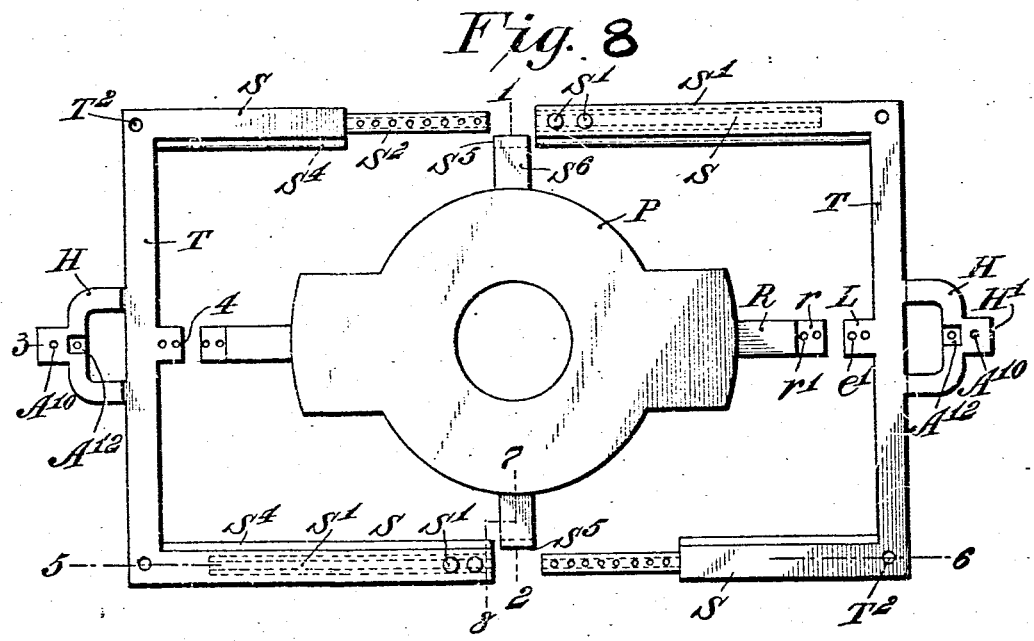
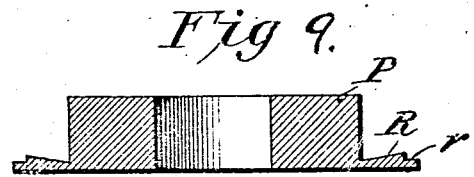
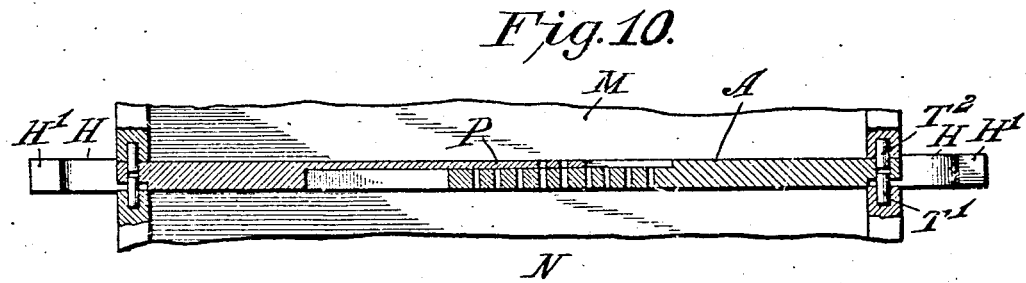
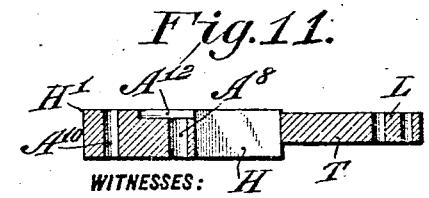

FREDERICK W. HALL, OF MERCHANTVILLE, NEW JERSEY, ASSIGNOR TO J. W. PAXSON COMPANY, OF PHILADELPHIA, PENNSYLVANIA, A CORPORATION OF PENNSYLVANIA.

MOLDING-MACHINE.

No. 895,011.  Specification of Letters Patent.  Patented Aug. 4, 1908.

Application filed December 28, 1906. Serial No. 349,762.

*To all whom it may concern:*

Be it known that I, FREDERICK W. HALL, a citizen of the United States, residing at Merchantville, Camden county, State of New Jersey, have invented certain new and useful Improvements in Molding-Machines, of which the following is a full, clear, and exact description, reference being had to the accompanying drawings, forming a part of this specification.

My invention relates generally to apparatus for forming sand molds for the production of metal castings, and specifically to the pattern-supporting frame and to the flask fittings, used in such apparatus, especially when the latter are employed in a machine containing means for supporting the flask elements and the pattern-supporting frame and for ramming the sand in the flask, around the pattern, to form the mold, and for vibrating the pattern-frame to release it from the sand mold.

My invention has for its objects first to provide a flask frame for the pattern, of such character that the strain on the molded patterns or castings, caused by the sand under pressure, will be largely taken up; a strain which, in flask and vibrator frames as now made and used, frequently results in fracturing the molded metal patterns.

Another object is to provide a frame, adjustable in area, to adapt it to hold a greater variety of sizes of patterns than is now possible.

To these ends my invention consists first, in constructing the pattern-supporting frame in sections, with means to guide the sections to and from each other and to lock them in any position of adjustment relatively to each other; also in constructing and combining the flask fitting of the drag and the handle of the pattern frame, in such manner as to provide a lateral recess or space between the flask fitting of the drag and the handle of the pattern-frame.

The new mode of operation inherent in my invented improvements results in an adjustability, as to size, by means of the sectional pattern-supporting frame, whereby many different sizes of patterns, within a wide range, can be used in the same frame, resulting in great economy; then the guide for the pattern-frame on the flask-fitting is of such character as to provide adjustability of those elements, relatively, while heretofore such guide has been stationary, the latter resulting necessarily in hard usage of the patterns; then in my device, the vibrator secured to the pattern-frame cannot rest on the flask or its fitting, and the construction of the pattern-frame is such as to leave a clearance of about 1/32 of an inch between it and the top of the drag fitting, in a sort of pocket in which that end of the frame is supported.

In the accompanying drawings:—Figure 1 is a side elevation of the flask fittings, in position on the drag and cope; and with the pattern frame between them; Fig. 2 is an end elevation thereof. Fig. 3 is a plan view of the handle of the divided pattern-frame (the latter partly broken away), the dotted lines showing the fittings on the drag. Fig. 4 is a detached plan view and Fig. 4$^A$ a like view in elevation, of the guiding pin in place in the drag fitting; Fig. 5 is an elevation, detached, of the guiding pin for the pattern frame and the cope fitting and holding lugs for the pattern frame, in appropriate relation to each other; Fig. 6 is a plan view, Fig. 6$^A$ a longitudinal vertical section and Fig. 6$^B$ an end view, of one end of the pattern-frame supporting the gate of patterns, and showing the handle of the frame to which the vibrator is attached, and the recess in the frame handle to receive the flask frame. Fig. 7 is a side view, Fig. 7$^A$ a plan, and Fig. 7$^B$ an end view, of an adjustable fitting on the pattern frame, the first two views showing the spring rod by which it is maintained in appropriate relation to the guiding pin on the drag; Fig. 8 is a plan view of my new divided pattern-carrying frame, the sections being separated, but in position ready for assembling, to show more clearly the construction and mode of operation; Fig. 9 is a section through the pattern on the line 1—2 of Fig. 8; Fig. 10 is a section on the line 5—6 of Fig. 8, except that the sections of the divided frame are assembled, showing also parts, broken away, of the drag and cope of the flask, and showing in elevation the handles on the frame; Fig. 11 is a section on the line 3—4 Fig. 8, of the handle and part of the frame; and Fig. 12 is a section on the line 7—8 of Fig. 8 showing part of the pattern frame, the cavity therein in which is slid the arm connecting the sections of the frame, and the connecting bracket or feeder on the pattern.

In the said drawings (Figs. 1 and 2) there is sufficiently indicated at M the cope and at N the drag, of a flask suitable to be operated in a molding machine, and between them is my divided pattern-frame A adapted to support a gate of patterns, in the manner such as shown in Figs. 8 to 12. Describing the pattern-holding frame A, first by reference to Figs. 3 and 6 wherein only a broken away portion of the frame is shown, it is to be understood that when its sections are assembled it is a rectangular frame, as usual, and is supplied on the two opposite sides T where the flask fittings coincide, with inwardly projecting lugs L, recessed at $A^9 A^9$ whereto the gate of patterns, at each end, is fastened. Each of said opposite sides T of this pattern-frame A is formed with a yoke-shaped handle H having a projection H', recessed at $A^{10}$, for the purpose of conveniently securing thereto the pneumatic or other form of vibrator necessary to impart a tremulous motion to the patterns in the sand, after forming the mold therein, to shake them free from the sand mold and enable the latter to be removed for use, in a perfect condition. Referring now to Figs. 8 to 12, showing the pattern-frame, in full, it will be seen that it is constructed in two like sections, each consisting of a frame portion T with rectangular frame ends S, S'; the portion or side T of each coincides, in position, with the flask fittings. The frame side S' is hollowed or recessed for a portion of its length, indicated by the dotted lines, to receive a projection $s^2$ on the end of the frame S. These opposite sides of the frame are arranged in reverse position relatively, so that they will telescope when assembled, and screw-holes $s'$ are provided in the portion S' to receive screws to hold them temporarily in assembled position. The preferred form of the hollow interior or longitudinal cavity $t'$ in the frame side S' to receive the projection $s^2$ on the frame side S, is shown in section in Fig. 12.

The pattern is indicated at P, Fig. 8, and is supported by the gate feeder or connecting piece R (Fig. 9) which rests upon the lugs L of the pattern-frame, which overlaps the recessed portion $r$ of the gate feeder, and secured thereto by pins placed in the holes $r'$ and $l'$, or in any other suitable and usual way. I prefer to supply the frame with a ledge $s^4$ on the inside of the frame sides S S' (see Figs. 11 and 12) to support the end $s^5$ of the opposite pattern-connecting feeder $s^6$.

By reference to Fig. 10, showing the relation of the cope M and drag N of the flask, to the pattern frame, it will be seen that oppositely disposed guide pins T' T' in the drag and cope frames enter holes $T^2$ in the pattern frame and fit them freely when the parts are assembled; the pins being on the opposite faces of the flask members are so disposed in length relatively to the holes $T^2$ in the pattern frame as to allow for a slight vertical play when the pattern frame is vibrated. The underface of the frame is recessed at $x^3$ (see Fig. $6^A$) to leave a shallow space between it and the drag fitting plate $c^4$ (Fig. 5) when the parts are assembled, as seen in Figs. 1 and 2, and this recess extends to the region of the holes $T^2$. This construction and arrangement of the elements allows for all necessary vertical movement during vibration of the frame, and allows the vibrating or rapping device to impart a general tremor throughout the frame. Pattern-frame yoke-handle H with its projection H' perforated at $A^{10}$ is provided to conveniently fasten thereto any form of automatic rapping device or vibrator commonly used in the art.

The drag N is supplied with a fitting (see Figs. 4 and $4^A$) which consists of a bracket support C screwed to the exterior of the opposite end walls of the drag N, and having an outwardly projecting base-plate $C^5$ on which is a socketed upright $C^6$ to support the end of a long upright steel pin C', operating as a guiding pin for the cope. This pin, when the elements are assembled in operative position, passes through the yoke-opening in the handle of the pattern frame and through the openings in the cope fitting and enables the latter to be guided to proper relative position when it is lifted off or on to the pattern frame. The steel pin C' is held in the socketed base by a pin $C^2$. The bracket C has upright stop lugs $C^3 C^3$ (see Figs. 4 and $4^A$) which operate to hold the pattern-frame stationary, when the parts are assembled; and said bracket C has also, preferably, a rearwardly projecting deep flange $C^4$ which lies over the edge of the drag and provides a metal surface on that part of the drag N over which the pattern-frame is supported. The relation to each other of these several elements of the drag-fitting, is best seen from Fig. 5, and the relation of all of them to the pattern frame and to the cope fitting, is shown in Fig. 1.

For the purpose of maintaining the pattern-frame in appropriate operative alinement with the drag fitting, the yoke-like handle H opposite the projection H' is recessed planularly at $A^{12}$ (see Fig. 6) to receive the spring-supporting and guiding plate A' shown in side elevation in Fig. 7 and in plan view, Fig. $7^A$. The downwardly projecting flange edge $e$ of this plate A' (see Fig. 7) supports a thin flat spring $A^3$, secured to it at $A^5$. At each end of this flat spring is secured an inwardly projecting plate $A^4$ with a concave end $A^2$ corresponding in shape to the guiding pin C' on the drag-fitting (Fig. $7^A$). The said plate A' has a long slotted screw-hole $A^6$ to allow room to shift it in the slot $A^{12}$ of the yoke-handle of the pattern-holding frame, and thereby adjust its length of projection into the space formed by the yoke-handle and to and from the guiding-pin, thereby increasing or lessening, as the case may be, the tension on said spring.

The operation of the device will be fully understood from the description given; it need only be added that vibration of the pattern-holding frame on its vertically yielding guide pins will produce as well a slight vertical movement of the pattern-frame relatively to the flask elements and a general tremor throughout both sufficient to loosen the pattern in the sand and restricted sufficiently to prevent injuring the sand mold; and that, in consequence of the construction described, the sand-ramming strain is distributed between the pattern and the pattern-frame which supports it; and the impact blow is against a more or less resilient or yielding frame, because it rests to some extent on the sand in the flask, and the natural elasticity of the rebound from such a substance is allowed full play by the provision of the guide pins on the flask elements loosely fitting the holes in the pattern-frame and permitting vertical movement of the latter relatively to the flask elements. These last-mentioned features of my invention accomplish two wholly novel results, marking described advances in the art, namely, avoidance of the usual strain, and consequent breaking of the pattern due to the ramming strain; and the production of a perfect sand mold without the provision of any means to provide lateral movement of the pattern-frame relatively to the flask or its supports during the rapping or vibrating of the frame to release the pattern from the sand mold.

Having thus described my invention, I claim as new and desire to secure by Letters Patent:—

1. A pattern-holding frame for molding machines, which is sectionally divided and extensible longitudinally, whereby it may be operatively set in various positions of longitudinal adjustment to form a frame of varying superficial area, said frame consisting of a pair of substantially rectangular sections each constituting a moiety of the frame, with connecting ends on each section adapted to maintain said sections in adjusted relation; and with means constituting an integral part of the frame adapted to operatively support a pattern gate within the same.

2. In molding apparatus, a pattern-holding frame composed of a pair of sections arranged in reverse relative position, means to maintain them in adjusted relation longitudinally to form a frame of varying superficial area, means integral with each section adapted to support a pattern-gate within the frame, and an outwardly projecting yoke-handle on each section adapted to operatively support a vibrating device.

3. In a molding apparatus, a pattern-holding frame composed of two longitudinally unitable sections, provided with connecting means adapted to be brought into register in sleeve-like relation, and with means to lock them in various positions of longitudinal adjustment.

4. In a molding apparatus comprising a pattern-holding frame adapted to be brought into operative register with the flask elements, the combination therewith of means between said elements operating to permit a slight vertical guided movement of the pattern-holding frame and also a limited endwise movement thereof on the flask, said means consisting of oppositely-disposed guide pins in the drag and cope frames, the pattern frame being provided with holes which fit said pins freely when the parts are assembled, said pattern frame having also a shallow recess on its underface.

5. In a molding apparatus, the combination with flask elements and an operatively interposed pattern-holding frame between said flask elements, of a spring-controlled bracket vertically supporting the pattern frame relatively to the flask elements, means to adjust the tension of such spring when said elements are brought into operative alinement, and means to guide the pattern frame in a vertical direction during its vibration to release the pattern from the sand.

6. In a molding apparatus, the combination with the drag of the flask provided with an upright guiding pin adapted to pass through the cope and frame fittings, a pattern-holding frame, and means operating as well to maintain said elements in operative vertical alinement as to provide a resilient support for the frame, said means consisting of a spring-supporting and guiding plate mounted in the handle of the frame, and provided with a flanged edge, a flat spring supported therein and carrying on each of its ends devices registering with the guiding pin of the drag fitting.

7. In a molding apparatus the combination of flask elements, with guiding devices thereon, of a pattern-holding frame adapted to be interposed between them, a yoke-like handle on said frame recessed to support an adjustable plate, a flat spring supported vertically on the edge of said plate and within the space formed by the yoke-arm of the handle and arranged to normally bear against one of said guiding devices of the flask elements.

In testimony whereof, I have hereunto affixed my signature this fifteenth day of December A. D. 1906.

FREDERICK W. HALL.

Witnesses:
ALFRED ROSENSTEIN,
A. M. BIDDLE.